C. R. PIETSCH.
MICROMETER GAGE.
APPLICATION FILED NOV. 25, 1908.
919,455.
Patented Apr. 27, 1909.
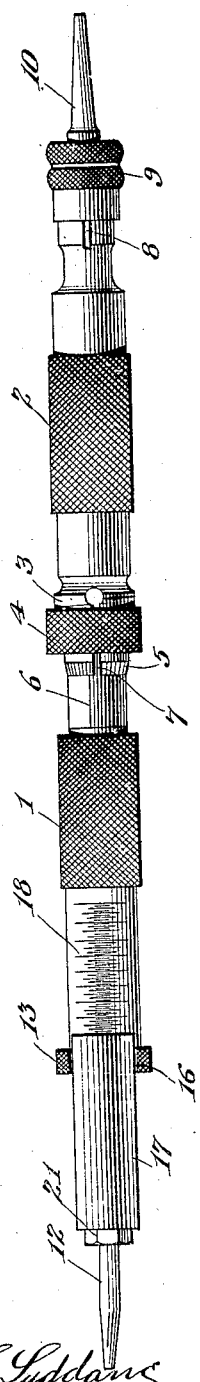
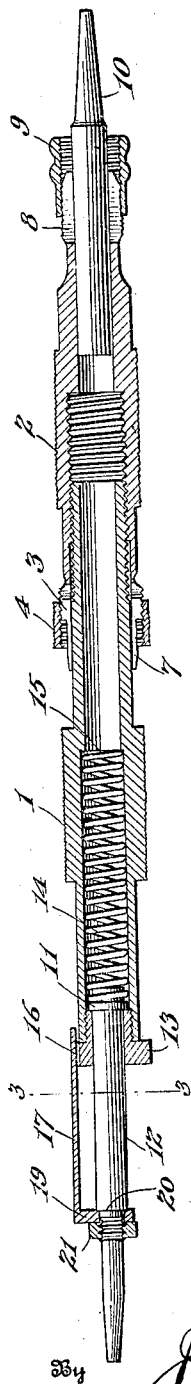
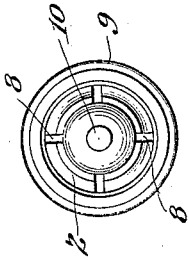
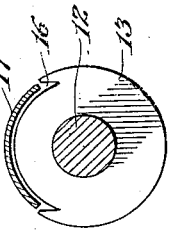
Inventor
Clement R. Pietsch

UNITED STATES PATENT OFFICE.

CLEMENT R. PIETSCH, OF SPARKS, NEVADA.

MICROMETER-GAGE.

No. 919,455.  Specification of Letters Patent.  Patented April 27, 1909.

Application filed November 25, 1908. Serial No. 464,463.

*To all whom it may concern:*

Be it known that I, CLEMENT R. PIETSCH, a citizen of the United States, residing at Sparks, in the county of Washoe and State of Nevada, have invented certain new and useful Improvements in Micrometer-Gages, of which the following is a specification.

My invention relates to an improved micrometer gage particularly designed for internal measurements, such as the inside measurement of an eccentric strap and the like, the object of the invention being to provide an improved device of this character which can be readily inserted and removed, and which is capable of extremely fine adjustments such as one one-thousandth of an inch.

A further object is to provide an improved device of this character in which the rod at one end is elastically projected, but which can be moved inward against the action of a spring, which permits the gage not only to measure the movement of the rod from one position to another, but also enables the gage to be readily moved into and out of position.

With these and other objects in view, the invention consists in certain novel features of construction, and combinations, and arrangements of parts as will be more fully hereinafter described and pointed out in the claims.

In the accompanying drawings, Figure 1, is a view in elevation illustrating my improvements. Fig. 2, is a view in longitudinal section. Fig. 3, is a view in section on the line 3—3 of Fig. 2, and Fig. 4, is an end view.

1 and 2 represent tubular barrels forming a body having annular milled or roughened enlargements as clearly shown, to facilitate the adjustments of the gage. The barrel or member 1 is provided at one end with external screw threads, meshing with internal screw threads in barrel 2, and these threads are accurately measured, and are provided at the rate of twenty-five threads to an inch.

The inner end of member 2 is made with longitudinal slits 7, and is provided with a slightly tapering threaded external portion 3 to receive a clamping nut 4. This clamping nut 4 is adapted to clamp this slit end of member 2 on member 1 and securely lock the parts at the desired adjustment. The extreme inner end of member 2 is beveled and provided with an annular scale 5 which registers with a line 6 on member 1. The indicating marks of this scale are arranged so that there will be just forty of such marks an equal distance apart around the member 2. It will thus be seen that one complete turn of one member upon the other will, due to their intermeshing screw threads, lengthen or shorten the body a distance of one twenty-fifth of an inch, as the threads are at the rate of twenty-five to an inch. As there are forty marks on the scale 5, it will be seen that when one of the members is moved with relation to the other a distance from one mark to the other on the scale 5, the gage will be lengthened or shortened just one one-thousandth of an inch, as the case may be, and can be securely clamped at this adjustment by the nut 4.

The outer end of member 2 is made with longitudinal slits 8, and a clamp nut 9 is screwed on to the externally threaded end of member 2, so as to clamp a rod 10 at any adjustment in the member 2. The outer end of member 1 is adapted to receive the headed end 11, of a rod 12, and a tubular plug 13 is screwed into the end of member 1 and limits the outward movement of rod 12.

A coiled spring 14 is located within member 1 and bears at one end against an internal shoulder 15 in member 1 and at its other end against the head 11 of rod 12, so as to force the latter to its extreme outward position. The tubular plug 13 at its outer end is of greater diameter than the diameter of member 1, and is made with a curved recess 16 to accommodate a pointer blade 17, and the end walls of the recess 16 will prevent any rotary movement of the pointer blade, so as to always compel the blade to register with a suitable scale 18 on the outer face of member 1. This blade 17 is provided with a lug 19 having an opening therein to receive the outer contracted portion of rod 12, and is securely held against a shoulder 20 on the said rod 12 by means of a nut 21 slipped onto the outer end of rod 12, and screwed on to a threaded portion of the rod as clearly shown.

The operation of my improvements is as follows: The gage members 1 and 2 are adjusted with relation to each other down to one one-thousandth of an inch by means of the scale 5 as above explained, and the nut 4 is turned to rigidly clamp the members against movement. To insert the gage in position, the rod 12 is moved inward against the action of spring 14, and when the rod is released with the gage in place, the spring 14 will move the rod outward as far as it can. As the pointer blade 17 is carried by, and moves with, the rod 12, it will measure on the scale 18 of member 1, the exact space that must be removed to secure the proper inside diameter of an eccentric strap or the like. As the internal diameter of the strap is increased, it will be clearly indicated by the blade 17 on scale 18, and when the blade 17 is at the end of the scale 18 the work will be completed. By reason of this construction of spring pressed rod 12, I am enabled to insert the gage in position, and it will hold itself, and the gage can be moved through an opening smaller than the opening it is to register, as the rod 12 can be moved inward a considerable distance. This is a very desirable feature as it enables the gage to be used to measure inside diameters, which would not be possible, or at least extremely difficult, with gages in which the parts are rigid.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. A device of the character described, comprising a tubular body having a scale thereon, and a spring-pressed rod in one end of the tubular body, a blade carried by said spring-pressed rod and registering with the scale on the body, and a tubular plug in the end of the body having a recess in which the blade moves.

2. A device of the character described comprising a tubular body having a scale thereon, a tubular plug screwed into the end of said body and having an enlarged outer portion, said outer portion made with a curved recess, a rod mounted to slide in the tubular plug, a head on the inner end of said rod, a spring in the body bearing against said head, a blade or pointer, a perforated lug on the blade located on the rod, a nut securing the lug on the rod, said blade curved in cross section, and located in the curved recess in the plug and having its end registering with the scale on the barrel.

In testimony whereof I have signed my name to this specification in the presence of two subscribing witnesses.

CLEMENT R. PIETSCH.

Witnesses:
  JOHN P. WOLTZ,
  ERNEST C. BLOOM.